United States Patent [19]

Prudhomme

[11] Patent Number: 5,469,778

[45] Date of Patent: Nov. 28, 1995

[54] FRYER BASKET LIFT

[76] Inventor: Malcolm J. Prudhomme, Rte. 3, Box 310, Arnaudville, La. 70512

[21] Appl. No.: 334,319

[22] Filed: Nov. 1, 1994

[51] Int. Cl.⁶ .................................................. A47J 37/12
[52] U.S. Cl. .................................................. 99/336; 99/407
[58] Field of Search ........................... 99/335, 336, 403, 99/407–413, 327, 330, 331; 426/117

[56] References Cited

U.S. PATENT DOCUMENTS

| | | | |
|---|---|---|---|
| 1,478,939 | 12/1923 | Cavilla | 99/336 |
| 2,127,749 | 8/1938 | Noeth et al. | 99/336 |
| 2,196,968 | 4/1940 | Bemis | 99/336 |
| 3,026,790 | 3/1962 | Arvan | 99/336 |
| 3,364,845 | 1/1968 | Wilson et al. | 99/336 |
| 3,690,246 | 9/1972 | Guthrie, Sr. | 99/410 X |
| 3,821,925 | 7/1974 | Moore | 99/407 X |
| 4,719,850 | 1/1988 | Sowell | 99/407 |
| 4,852,471 | 8/1989 | Lansing | 99/330 |
| 4,951,558 | 8/1990 | Figliuzzi | 99/336 |
| 5,379,684 | 1/1995 | Ettridge | 99/336 |

FOREIGN PATENT DOCUMENTS 3221433  12/1983  Germany ........................ 99/336

*Primary Examiner*—Timothy F. Simone
*Attorney, Agent, or Firm*—Dowell & Dowell

[57] ABSTRACT

An apparatus for raising and lowering cooking baskets in a commercial deep-fat fryers which includes a basket support carried by a lift assembly which is vertically reciprocated along a guide track by a timed lift mechanism.

13 Claims, 3 Drawing Sheets

FRYER BASKET LIFT

BACKGROUND OF THE INVENTION

1. Field of the Invention

This invention is generally directed to a device which may be utilized with commercial type deep-fat fryers for raising and lowering cooking baskets utilized in such fryers. More specifically, the invention is directed to a heavy-duty fryer basket lift assembly which allows for one or more cooking baskets to be automatically lowered into a fryer tub and, after a predetermined time, raised from the fryer tub after food products within the baskets have been cooked.

2. History of the Related Art

The use of deep-fry fryers for cooking food products is well known in commercial, institutional, as well as governmental food service operations. The cooking oils utilized in such deep-fat fryers are elevated in temperature to a point where economical and efficient cooking times are achievable for preparing a variety of fried foods. When cooking chicken parts or other fried foods in a commercial or institutional kitchen in large amounts, the chicken parts are simply dropped inside the fryer into the hot oil. There is a heat exchange tube screen in the bottom of the fryer to prevent chicken from coming in contact with the hot heat exchanger which heats the oil. A basket is not used as the chicken parts must be allowed to float freely inside of the fryer to prevent the chicken parts from sticking together during cooking.

For instance, as many as 60 pieces of chicken may be dropped into the hot fryer oil at one time. This means that approximately twenty (20) to twenty-five (25) pounds of cooked chicken must be taken from the fryer after it is cooked. The current method of removing the chicken, or other fried food, incorporates a hand held basket type scoop which is used to scoop the chicken from the fryer oil.

One of the greatest hazards associated with the food service industry is exposure of cooks and other employees to the hot oil utilized in deep-fat fryers. Such oil is not only potentially hazardous due to the high temperature at which the oil is maintained in order to insure proper cooking of foods, but the oil, if spilled onto adjacent equipment or floor surfaces, creates dangerous conditions which can lead to bodily injury due to falls. The manual scooping of cook foods from large fryers contributes to such conditions.

In smaller deep-fat fryers, baskets having elongated handles are used to retain the food being cooked. The use of manually lifted baskets, however, is inherently unsafe. Even if the quantity of food being cooked is relatively small and therefore the weight of the food product not a significant factor, workers are directly exposed to the hot cooking oil and the possible spattering of the oil when a fryer basket is lowered or raised into the oil. Also, as with large fryers, foods can easily be overcooked when reliance is placed on manual removal of the cooking a basket from a fryer.

As previously mentioned, a major problem associated with the food services industry, which is directly related to the preparation of deep-fat fried foods, is in maintaining a consistency of quality in the prepared product. In order to overcome this problem, controls have been specifically designed for monitoring the temperature of the cooking oil and the cooking time for deep-fat fryers depending upon the quantity and type of food which is being cooked. In this respect, it is desirable to make the cooking process as automated as possible and to take out of the cooking process any possibility of human error such as in either removing a product from a cooking oil before it is fully cooked or in leaving the product in the cooking oil to a point at which the product is overcooked. There is great diversity in the cooking time or cycle of products immersed in cooking oil. In those instances where the product must be manually lowered or manually raised from the cooking oil, not only does the time of immersion vary from the time of introduction of the food product, but the response time of an individual raising the product from the cooking oil also varies greatly.

In view of the foregoing, there is a need to provide a safer and more reliable manner in which to manipulate foods being introduced into and being removed from deep-fat fryers. Further, there is a need to provide for the automated handling of bulk foods being cooked in deep-fat fryers to ensure quality control of such foods.

SUMMARY OF THE INVENTION

This invention is directed to a fryer basket lift assembly which may be used for raising and lowering fryer cooking baskets into either small or commercial, institutional, industrial or governmental large size deep-fat fryers. The invention includes a basket support which is securely mounted so as to extend from a lift assembly which is vertically reciprocated relative to a fryer tub by a timed lift mechanism. In the preferred embodiment, the lift assembly includes a moveable bracket which is guided by a guide track which may include opposing channels mounted vertically along an interior wall of the fryer tub. The basket support is secured to the bracket so as to be totally immersed within the tub when in a lower position and to be elevated above the surface of the cooking oil when the bracket is raised to an upper position by the timed lift mechanism. The lift assembly further includes a cable which is secured at one end to the moveable bracket and at opposite end to the timed lift mechanism.

In most instances, the timed lift mechanism will be mounted to a rear or back wall of a deep-fat fryer and the cable will extend over a pulley mounted along the upper portion of the rear or back wall to thereby reduce frictional forces as the moveable bracket is raised and lowered within the guide track. In one embodiment, the timed lift mechanism will include a motor having a drive shaft to which a crank arm is attached. A pair of microswitches are mounted in spaced relationship with respect to the outer end of the crank arm. Once switch will be engagable to stop the motor after the moveable bracket and the basket support are lowered into the tub of the fryer. The other switch will be engagable to stop the motor following a predetermined cooking cycle and after the moveable bracket has raised the basket support from the oil within the fryer. In this respect, the motor is connected to an appropriate timing device and is only activated to initiate lowering of the lift assembly and the basket support relative to the fryer to initiate a cooking cycle and to elevate the lift assembly and the basket support following the completion of the cooking cycle. Therefore, the microswitches deactivate the motor at each half revolution of its output or drive shaft.

In order that the fryer basket lift assembly of the present invention may be utilized with large high efficient fryers which utilize a ducted heating surface which is elevated from the bottom of the fryers, the basket support includes one or more reinforcing elements which are designed to be receivable between the heating ducts so that special baskets support therein are lowered to a maximum degree relative to the heating ducts of the fryer.

For the frying of bulk or large quantities of a food product, such as chicken parts, the invention also incorporates a large basket which is constructed to be of a size to conform to the interior side wall configuration of the fryer. The basket fits snugly against the side walls and bottom of the fryer. This design allows the chicken, or other food product, to float freely while cooking. At the end of a cooking cycle, the basket lift will raise the basket and the entire batch of chicken at one time. The basket is then retained above the oil in the fryer to allow the excess oil to drain off afterwhich the entire basket of chicken can be lifted at once and placed ready to serve.

It is a primary object of the present invention to provide an apparatus that allows for consistency in cooked fried food products which also saves on labor costs and is safer to use then conventional systems.

It is another object of the present invention to provide an automated lift assembly for raising and lowering fryer cooking baskets relative to commercial, institutional, or large governmental deep-fat fryers and which enables a significant quantity of food product to be raised and lowered automatically at a single time.

It is a further object of the present invention to provide a fryer basket lift assembly which will allow an automated raising and lowering of cooking baskets relative to the cooking oil in deep-fat fryers which may be easily secured to existing fryers so that manually lowering or lifting of food products into and out of the fryer oil is not necessary.

It is also an object of the present invention to provide a fryer basket lift assembly for use in deep-fat fryers which can be easily controlled so as to be responsive to an exact cooking time required for a food product being cooked so that, following a specific cooking time, a cooking basket is automatically raised from the fryer cooking oil to prevent over cooking of the food product.

DETAILED DESCRIPTION OF THE PREFERRED EMBODIMENT

Figure 1:
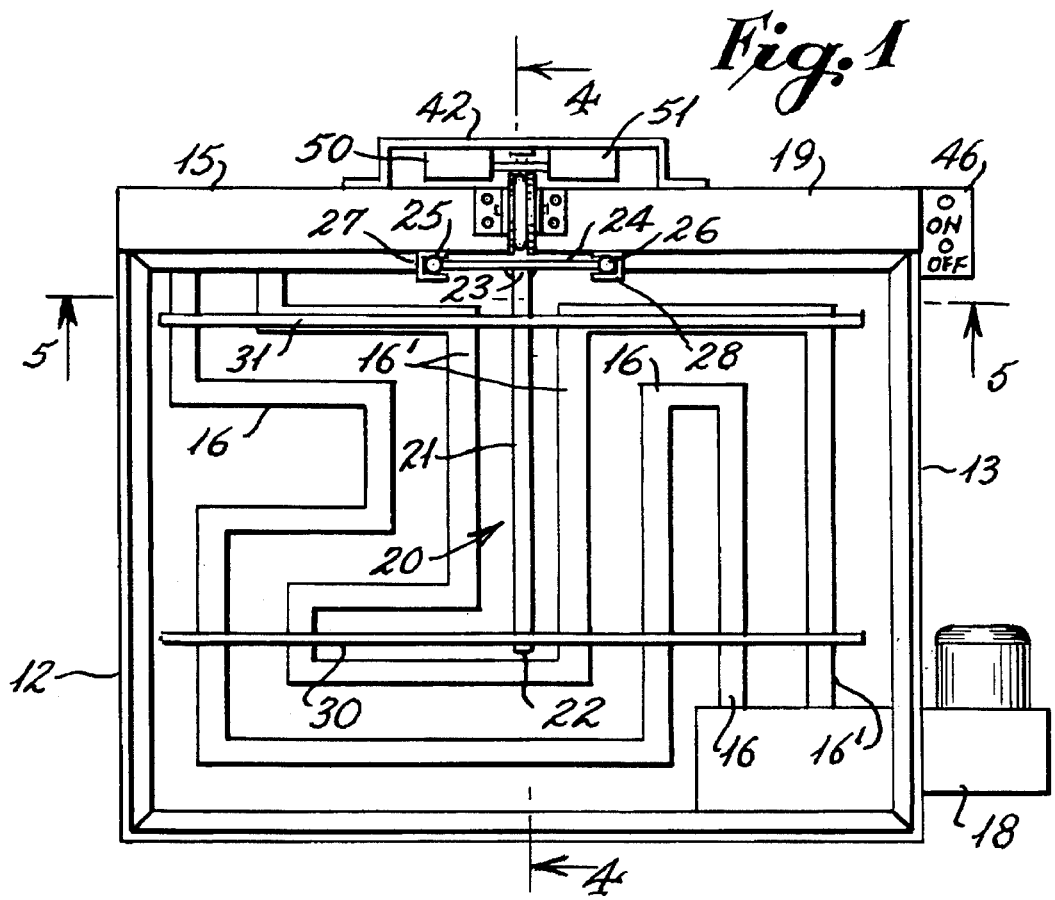
FIG. 1 is a top plan view of the fryer basket lift assembly of the present invention shown as being mounted to the back wall of one form of a commercial deep-fat fryer and showing the basket support oriented within the tub of the fryer above heat exchange ducting which extends upwardly from the bottom of the fryer.

With continued reference to the drawing figures, the present invention will be described as utilized with one type of commercial deep-fat fryer. The fryer is of the type disclosed in U.S. Pat. No. 4,848,317 in the name of the present inventor. It should be noted however, that the lift device of the present invention may be utilized with substantially any type of deep-fat fryer used to prepare fried foods including commercial, industrial, institutional or governmental large size fryers.

Figure 5:
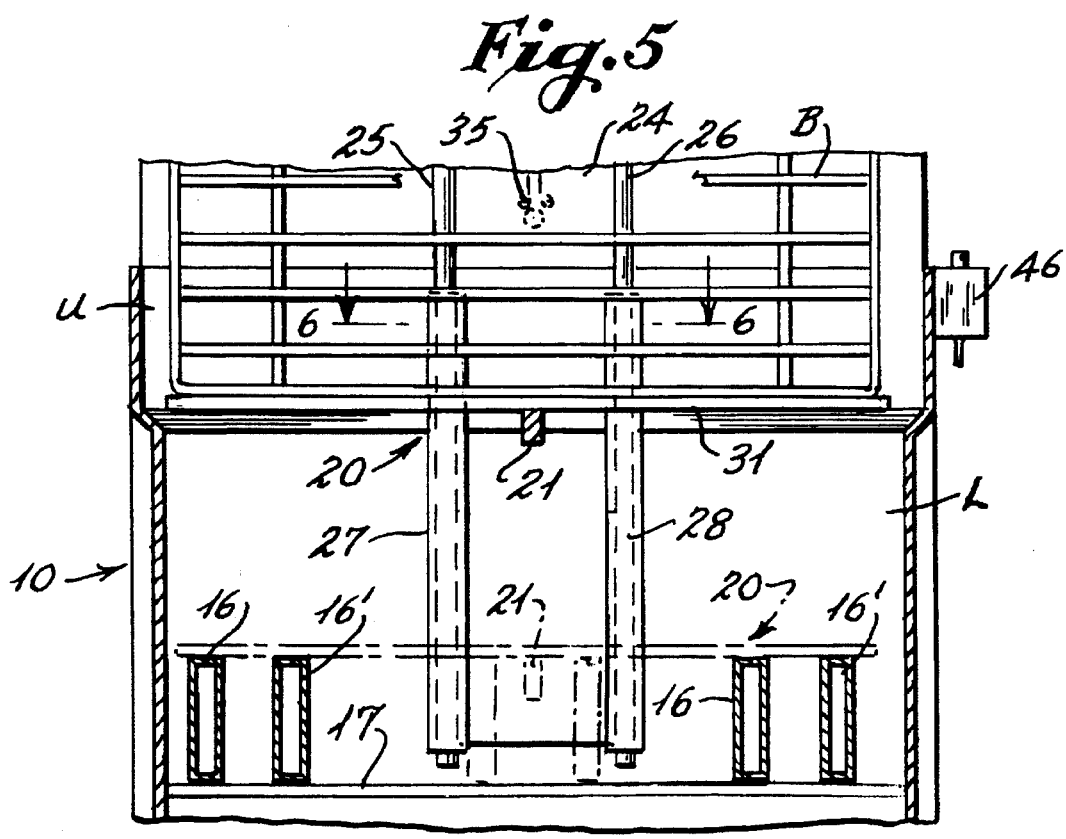
FIG. 5 is a cross-sectional view of the fryer tub of FIG. 1 showing a portion of the lift assembly and guide elements utilized with the present invention and the large cooking basket.
Figure 2:
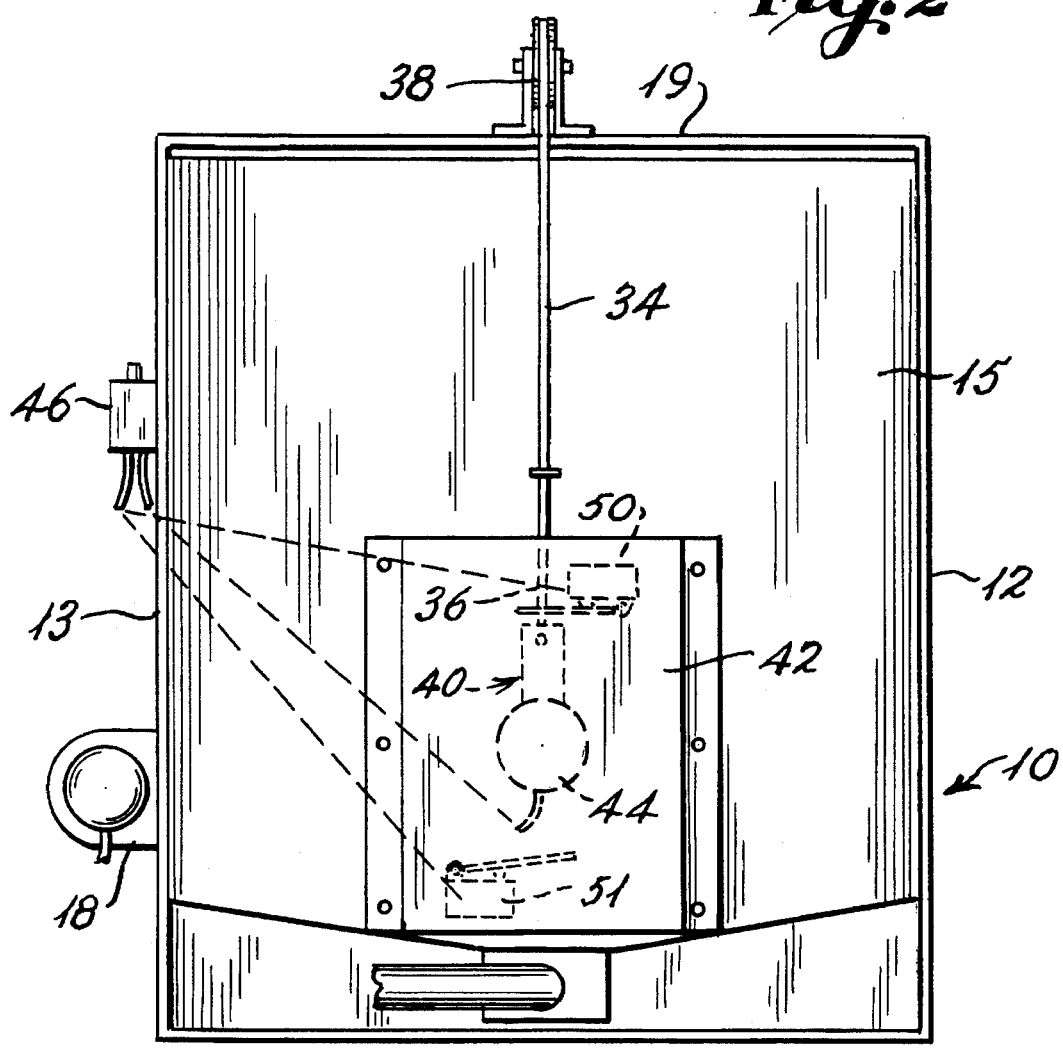
FIG. 2 is a rear view of the back wall of the fryer of FIG. 1 showing the lift cable of the present invention in full line and extending into a timed lift mechanism.
Figure 6:
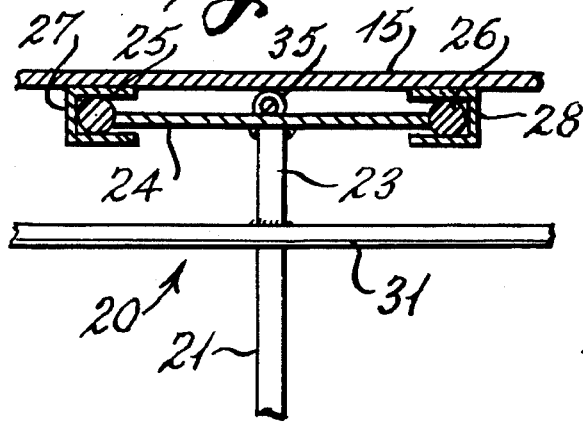
FIG. 6 is an enlarged cross-sectional view taken along lines 6—6 of FIG. 5.
Figure 3:
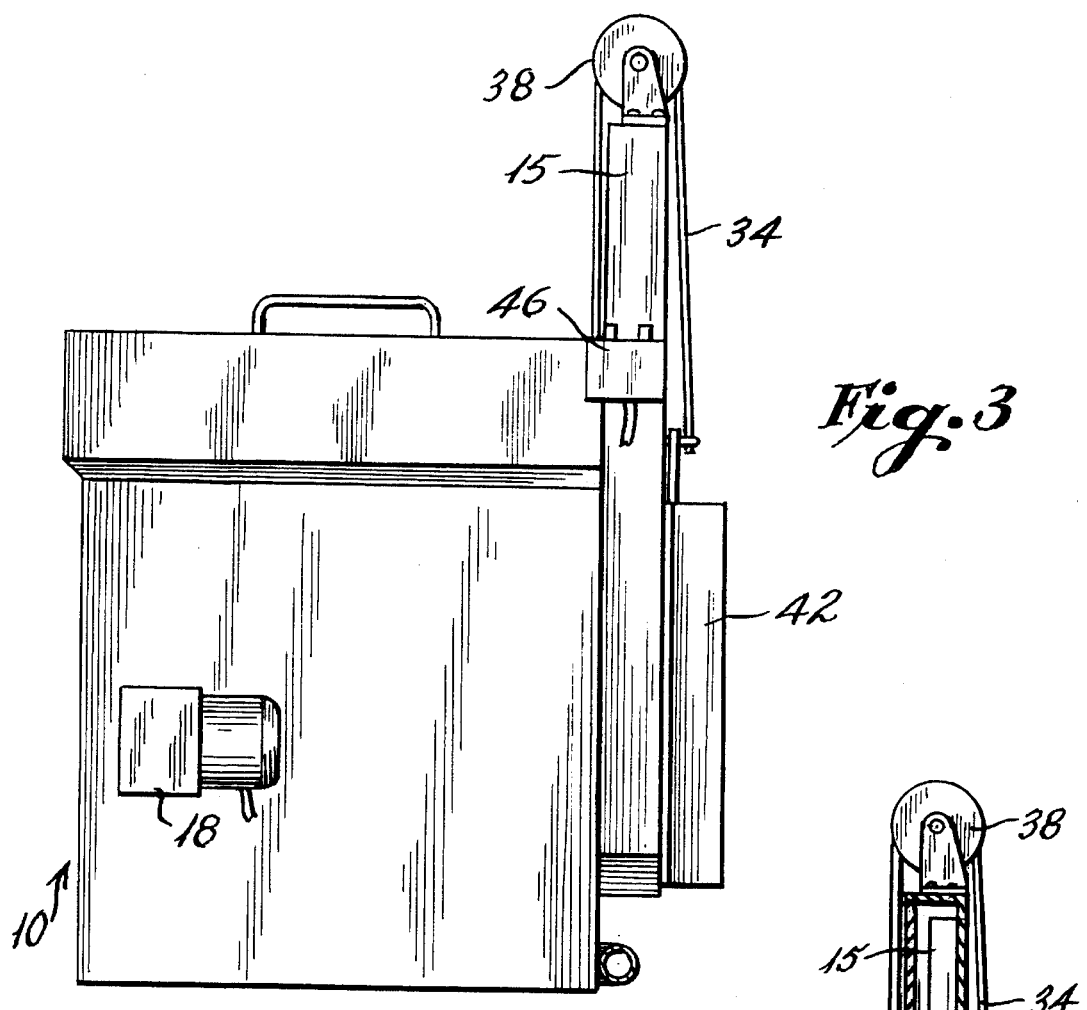
FIG. 3 is a side-elevational view taken from the left side of the fryer of FIG. 1.
Figure 4:
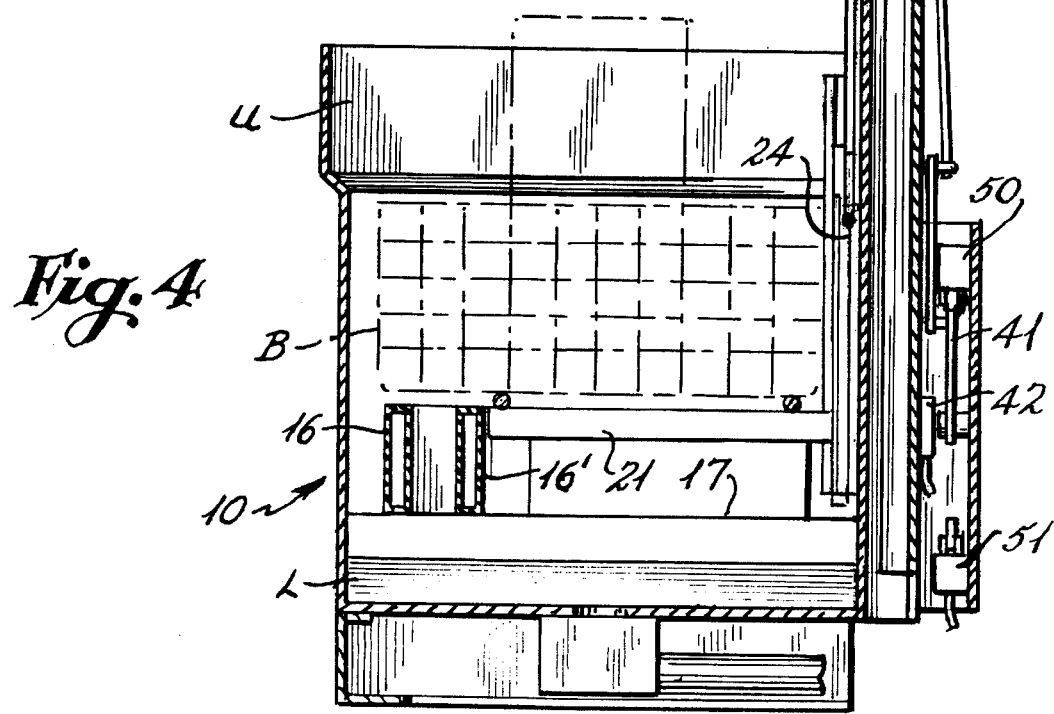
FIG. 4 is a cross-sectional view taken along the lines 4—4 of FIG. 1 through the tub of the fryer and showing the timed lift mechanism of the present invention and the large fryer basket (in dotted line).

The fryer 10 includes a tub 11 having a front wall 12 side walls 13 and 14 and rear or back wall 15. As shown in FIGS. 3 through 5, the tub is normally formed having a lower chamber "L" in which a deep-fat frying oil is contained. The oil may be heated by various heating devices or heat exchangers. In the present disclosure, the oil is heated by a plurality of vertically extending generally "S" shaped ducts 16 and 16' which extend upwardly from the bottom 17 of the fryer tub. Heated air is forced through the heat exchange ducts by a blower 18.

The upper portion of the tub is flared outwardly along the side walls 12, 13, and 14 so as to defined a containment area "U" wherein a basket "B" is retained, such as shown in FIG. 5, in a draining position above the oil within the lower portion of the tub. The rear wall 15 is shown as extending above the front and side walls and terminates at an upper surface 19. The fryer basket "B" of the present invention is designed to retain a large quantity of foods to be fried, such as sixty (60) or more pieces of chicken which may with twenty (20) to twenty-five (25) pounds or more. The basket includes a bottom open mesh screen and side walls of open mesh screens which are configured to conform to the size and shape of the walls 12, 13, 14 and 15 of the fryer so that the basket defines an inner volume which is substantially equal to the volume of the lower portion "C" of the fryer tub. In this manner, products being cooked will be allowed to float within the basket just as they would if placed in the fryer tub without a basket.

The fryer basket lift of the present invention includes a basket support 20 having at least one horizontally oriented reinforcing plate or element 21 having an outer end 22 and an inner end 23. The inner end is welded or otherwise secured to a vertically moveable bracket 24 which is welded along its side edges to a pair of slidable rods 25 and 26. The rods are guided within opposing and generally "U" shaped channels 27 and 28 which are welded or otherwise secured to the inner surface of the back wall 15 so as to extend downwardly within the tub of the fryer, as in shown in FIGS. 4 and 5. Other guide structures could be used.

The basket support further includes a pair of generally horizontally spaced rods 30 and 31 which are welded at their center point to the upper surface of the reinforcing plate or element 21. The plate 21 may be formed of a ¼ inch steel plate having a generally rectilinear cross-section, as is shown in FIG. 5. The rods 30 and 31 may be formed of ¼ inch steel rods. Other materials of sufficient strength and temperature resistance may be utilized. Further, the configuration of the rods and the plate 21 may be varied and be within the teachings of the present invention. It is necessary, however, to ensure that sufficient strength is provided in the basket support 20 to allow twenty-five (25) or more pounds to be retained on the support. In some instances, a plurality of reinforcing plates 21 may be incorporated and welded with the rods 30 and 31. In other instances, additional rods may be utilized or plates may be utilized in place of the rods. With specific reference to FIG. 4, and as shown in dotted line in FIG. 5, the plate 21 is positioned so as to be receivable between the vertically oriented portions of duct number 16' when lowered fully into the tub of the fryer so that the rods 30 rest against the upper surface of the heating ducts.

The bracket 24 functions as a first portion of a lift assembly which is used to raise and lower the basket support 20 relative to the tub of the fryer. A cable 34, or other suitable connecting element or elements, is connected at one end 35 to the bracket 24 and at its opposite end 36 to a timed lift mechanism 40, as will be described in greater detail hereinafter. In order to reduce friction of the cable relative to the rear wall 15 of the fryer, a pulley 38 is mounted to the upper surface 19 over which the cable extends.

Figure 7:
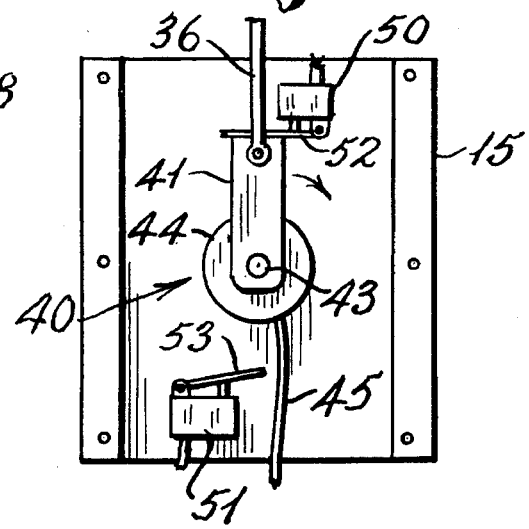
FIG. 7 is a view of the on-off switches of the timed lift mechanism of the present invention.

The timed lift mechanism 40 of the present invention may take various configurations. One type of mechanism is shown in the drawing figures. In this embodiment, the lift mechanism includes a crank arm 41 mounted within an enclosure which is secured to the back surface of the rear wall 15 of the fryer. One end of the crank arm 41 is mounted to the drive shaft 43 of a motor 44 also mounted within the enclosure 42. The motor is connected by electrical cable 45 to an "on-off" switch or other control drive 46. The opposite end of the crank arm 41 is secured to the end 36 of the cable 34. A pair of microswitches 50 and 51 having contact elements 52 and 53, respectively, are mounted within the enclosure 42 and serve to deactivate the motor to stop the movement of the cable 34 as it is moved by the crank arm 41 which is rotated by the drive or output shaft 43 of the motor 44. As shown in FIG. 7, when the basket support 20 is in its lower position within the tub of the fryer, once a cooking cycle is completed, motor 44 is activated by the control or "on-off" switch 46 thereby rotating the shaft 43 in the direction shown by the arrow. Crank arm 41 will rotate a half revolution until it engages the contact 53 of switch 51. At this point in time, the switch 51 will deactivated the motor and the basket will have been lifted out of the lower portion "L" of the fryer and will be positioned within the draining upper portion "U" of the fryer, as shown in FIG. 5.

When it is desired to lower an uncooked product into the cooking oil, the "on-off" switch 46 will activate the motor 44 to rotate the crank arm 41 from an engaged position with the switch contact 53 of switch 51 until the basket is lowered entirely into the tub of the fryer at which point the crank arm will again return to the position shown in FIG. 7 wherein contact is made with contact 52 of switch 50 thereby deactivating the motor 44.

It should be emphasized that other means for timing the lift mechanism to raise and lower the basket support may be utilized and be within the teachings of the present invention.

As the basket support 20 is raised and lowered, it will be positively guided by the bracket 24 which is secured at its sides to the rods 25 and 26 which track within the guide channels 27 and 28. In this manner, any basket placed on the basket support will be completely stabilized during the lowering or raising of the basket relative to the oil in the fryer.

I claim:

1. An apparatus for raising and lowering a cooking basket into a deep-fat fryer, wherein the fryer includes a tub having a bottom wall and side walls, each side wall having an upper edge, the apparatus comprising, a basket support and a lift means, said basket support being connected to said lift means, said lift means including a moveable bracket, at least one guide element for guiding said moveable bracket vertically within the tub of the fryer, said guide element including a pair of opposing generally "U" shaped track elements, said moveable bracket including a plate having outer edge portions receivable within said opposing track elements, a timed lift mechanism, means for connecting said moveable bracket to said timed lift mechanism, said lift mechanism including motor means for selectively raising and lowering said moveable bracket and basket support relative to the fryer tub when the basket support is positioned therein, means for deactivating said motor means when said moveable bracket is in a first position wherein said basket support is lowered into the tub of the fryer and for deactivating said motor means when said moveable bracket is in a second position when said basket support is elevated with respect to said first position, and said means for connecting said moveable bracket to said timed lift mechanism including a cable having a first end connected to said moveable bracket and a second end connected to said timed lift mechanism.

2. The apparatus of claim 1 in which said guide element includes a pair of opposing generally "U" shaped track elements, said moveable bracket including a plate having outer edge portions receivable within said opposing track elements.

3. The apparatus of claim 1 including a pulley, means for mounting said pulley to the upper edge of one of said side walls of said fryer whereby said cable is guided over said pulley between said first and second ends thereof.

4. The apparatus of claim 3 in which said motor means includes an output shaft, said timed lift mechanism including a crank arm with one end connected for rotation with said output shaft and an opposite end, means for connecting said opposite end of said crank arm to said second end of said cable.

5. The apparatus of claim 4 including first and second switch means mounted on opposite sides of said motor means, said first and second switch means being selectively engagable by said second end of said crank arm as said crank arm rotates with said output shaft of said motor, whereby each of said switch means deactivates said motor means when engaged by said second end portion of said crank arm.

6. The apparatus of claim 1 in which said basket support includes a horizontally oriented reinforcing element extending from said plate, and support elements mounted to said reinforcing element and extending generally perpendicularly therefrom.

7. The apparatus of claim 6 in which said motor means includes an output shaft, said timed lift mechanism including a crank arm with one end connected for rotation with said output shaft and an opposite end, means for connecting said opposite end of said crank arm to said second end of said cable.

8. The apparatus of claim 7 including first and second switch means mounted on opposite sides of said motor means, said first and second switch means being selectively engagable by said second end of said crank arm as said crank arm rotates with said output shaft of said motor, whereby each of said switch means deactivates said motor means when engaged by said second end portion of said crank arm.

9. An apparatus for raising and lowering a cooking basket into a deep-fat fryer, wherein the fryer includes a tub having a bottom wall and said walls, each side wall having an upper edge, the apparatus comprising, a basket support and a lift means, said basket support being connected to said lift means, said lift means including a bracket and a cable having first and second ends, at least one guide element for guiding said bracket vertically within the tub of the fryer, a timed lift mechanism, said first end of the cable being connected to said bracket and said second end of said cable being connected to said timed lift mechanism, said timed lift mechanism including motor means for selectively raising and lowering said bracket relative to the fryer tub when the basket support is positioned therein, means for deactivating said motor means when said bracket is in a first position when said basket support is lowered into the tub of the fryer and for deactivating said motor means when said bracket is in a second position above said first position when said basket support is elevated with respect to said first position, and said guide element including a pair of generally "U" shaped track elements mountable in space relationship with respect to one another, said bracket including a plate having outer edge portions receivable within said opposing track elements.

10. The apparatus of claim 9 including a pulley means for mounting said pulley to the upper edge of one of said side walls of said fryer whereby said cable is guided over said pulley between said first and second ends thereof.

11. The apparatus of claim 9 in which said motor means includes an output shaft, said timed lift mechanism including a crank arm with one end connected for rotation with said output shaft and an opposite end, means for connecting said opposite end of said crank arm to said second end of said cable.

12. The apparatus of claim 11 including first and second switch means mounted on opposite sides of said motor means, said first and second switch means being selectively engagable by said second end of said crank arm as said crank arm rotates with said output shaft of said motor, whereby each of said switch means deactivates said motor means when engaged by said second end portion of said crank arm.

13. The apparatus of claim 9 in which said basket support includes a horizontally oriented reinforcing element extending from said plate, and support elements mounted to said reinforcing element and extending generally perpendicularly therefrom.

* * * * *